United States Patent
Poloni et al.

(10) Patent No.: US 6,269,112 B1
(45) Date of Patent: Jul. 31, 2001

(54) ELECTRIC ARC FURNACE FOR CONTINUOUS CHARGING WITH FERROUS MATERIALS AND SEMICONTINUOUS TAPPING OF MOLTEN STEEL

(76) Inventors: Alfredo Poloni, Via G. Paolini 29, Fogliano Redipuglia; Gianpietro Benedetti, Strada Degli Aceri 32, Campoformido; Milorad Pavlicevic, Via Maniago 4/C; Matteo Vittorio Losciale, Via Canada 2F, both of Udine, all of (IT)

( * ) Notice: Subject to any disclaimer, the term of this patent is extended or adjusted under 35 U.S.C. 154(b) by 0 days.

(21) Appl. No.: 09/572,243

(22) Filed: May 17, 2000

Related U.S. Application Data
(60) Provisional application No. 60/134,722, filed on May 18, 1999.

(51) Int. Cl.[7] .................................................. F27D 23/00
(52) U.S. Cl. .............................. 373/78; 373/81; 373/84; 266/45
(58) Field of Search .......................... 373/2, 43, 78–84, 373/85; 266/44, 45, 326, 240

(56) References Cited

U.S. PATENT DOCUMENTS

| | | | |
|---|---|---|---|
| 2,783,990 | * 3/1957 | Tripmacher et al. | 373/84 |
| 4,740,989 | * 4/1988 | Steipe et al. | 373/2 |
| 5,462,259 | * 10/1995 | Guido | 266/45 |
| 5,535,235 | * 7/1996 | Ao et al. | 373/78 |

* cited by examiner

Primary Examiner—Tu Ba Hoang
(74) Attorney, Agent, or Firm—Kevin J. Garber (57) ABSTRACT

This invention is an electric arc furnace that can be continuously charged with ferrous materials, that can continuously melt the incoming charged materials, and that can semicontinuously tap molten steel by tilting to tap one side of the furnace or another. Continuous melting and refining can occur in lateral shafts adjacent to the central melting zone, and molten steel can be tapped from either of these shafts or directly from the central melting zone if desired. The furnace can be operated and tapped continuously, which provides many distinct advantages over what is currently available in the art.

37 Claims, 6 Drawing Sheets

14. Sample sketch sheet.

FIGURE 6

ELECTRIC ARC FURNACE FOR CONTINUOUS CHARGING WITH FERROUS MATERIALS AND SEMICONTINUOUS TAPPING OF MOLTEN STEEL

CLAIM OF PRIORITY

This application claims the benefit of a co-pending provisional application entitled "Melting Process in an Electric Arc Furnace Charged in Continuous with Ferrous Materials and Semicontinuous Tapping of Liquid Steel" that was filed in the United States Patent and Trademark Office on May 18, 1999, having Ser. No. 60/134,722.

TECHNICAL FIELD

This invention relates to an electric arc furnace and process for the continuous charging and melting of ferrous material and its alloys and for the semicontinuous tapping of molten steel from the furnace.

BACKGROUND OF THE INVENTION

Electric arc furnaces that can be continuously charged with scrap and from which molten steel can be semicontinuously tapped are known in the iron and steel industry. In these furnaces, the charge can be fed continuously by means of a conveyor belt, a revolving drum or buckets. When buckets are used, they are often filled with scrap in a separate area and transported to the furnace in a semicontinuous charging mode called "batch charging." It is also known to use multiple furnaces or melt zones for continuous charging in an efficient manner, as in U.S. Pat. No. 5,602,867 to Hubers et al., U.S. Pat. No. 3,783,169 to Newhall, and U.S. Pat. No. 3,379,815 to Parker.

These known electric arc furnaces which operate with a continuous scrap supply either tilt or use tilting devices to completely empty the furnace vessels between heats. A tiltable arc furnace that tilts in one direction to pour molten charge and in the opposite direction to remove slag is shown in U.S. Pat. No. 2,886,617 to Sorg et al. Tilting furnaces are also shown, for example, in U.S. Pat. No. 5,462,259 to Guido and U.S. Pat. No. 2,783,990 to Tripmacher et al.

One limitation of the technologies currently available for continuous melting is that scrap in the bottom part of the furnace is always in contact with the molten steel to be tapped, and therefore the overlying molten, refined steel layer may be polluted by the underlying scrap being melted. This can lead to off-specification product. Another limitation is that the composition and the temperature of the molten steel to be tapped cannot be accurately monitored, which also can cause quality problems. A third limitation is that the melting zone and the refining zone are full of solid and incompletely melted scrap which can clog the tapping hole and spill molten steel with the attendant loss of time and energy. To overcome these problems, the process must be temporarily stopped and the melting operation must be turned off in order to tap the molten steel. What is needed to overcome these deficiencies is a furnace with vessels which can be continuously charged and then tapped from side to side without interrupting the charging and the melting of incoming charge, and without emptying the entire furnace vessel between heats.

SUMMARY OF THE INVENTION

Our invention makes possible the continuous melting of ferrous materials such as sponge iron, scrap iron or iron ore in an electric arc furnace so that the electric arc is never turned off nor is the power ever reduced. The invention also allows the semicontinuous tapping of molten steel from the furnace. This invention assures the continuous melting of ferrous materials, which can be preheated along a feeding duct, the simultaneous and continuous refining of molten steel by a means that prevents contamination from the metal charge and eliminates the danger of clogging the tapping hole, and the semicontinuous tapping of molten steel when it is adequately refined.

Our invention comprises an electric arc furnace for continuous charging of ferrous materials and semicontinuous tapping of molten steel, comprising (a) a body, having a central melting zone and at least two lateral shafts adjacent to the central melting zone, the base of said central melting zone being higher in elevation than the bases of the lateral shafts; (b) a roof over the body; (c) a central stack extending vertically from the roof above said central melting zone, the central stack having a means for charging ferrous materials into the central melting zone, having a means for removing exhaust gases from the central melting zone and having a pivot point located below the means for charging; (d) a means for melting material charged into the furnace; (e) a means for tapping molten steel from the furnace; (f) a means for injecting refining aids into the lateral shafts; (g) at least one deslagging door positioned within the body; and (h) a means for tilting the furnace to alternatively tap the lateral shafts. The lateral shafts act alternatively as containers for the molten steel and as vessels for the refining process. These two functions can be interchanged without shutting down the furnace. A means for tilting the furnace about a vertical axis allows for the tapping of steel alternatively from either lateral shaft and from the central melting zone if so desired. The oscillating stroke is small, but sufficient to convey the molten steel into a lateral shaft while at the same time to allow the refining process to be carried out in the alternate lateral shaft until the steel is tapped. Deslagging occurs through a side door of the furnace body.

According to another feature of the invention, the electric arc furnace is fitted with a means to supply electrical energy, oxygen and additives. The melting process includes the use of injecting lances for fuel and combustent gases, such as oxygen, with a high-density jet, and a means to seal the furnace electrode openings.

Optionally, our invention can also charge molten metal directly into the refining shafts. It can be used as a ladle furnace to correct the final steel analysis, thus eliminating the present need for a refining phase in the ladle station of steelmaking plants.

DETAILED DESCRIPTION OF THE INVENTION

Figure 1:
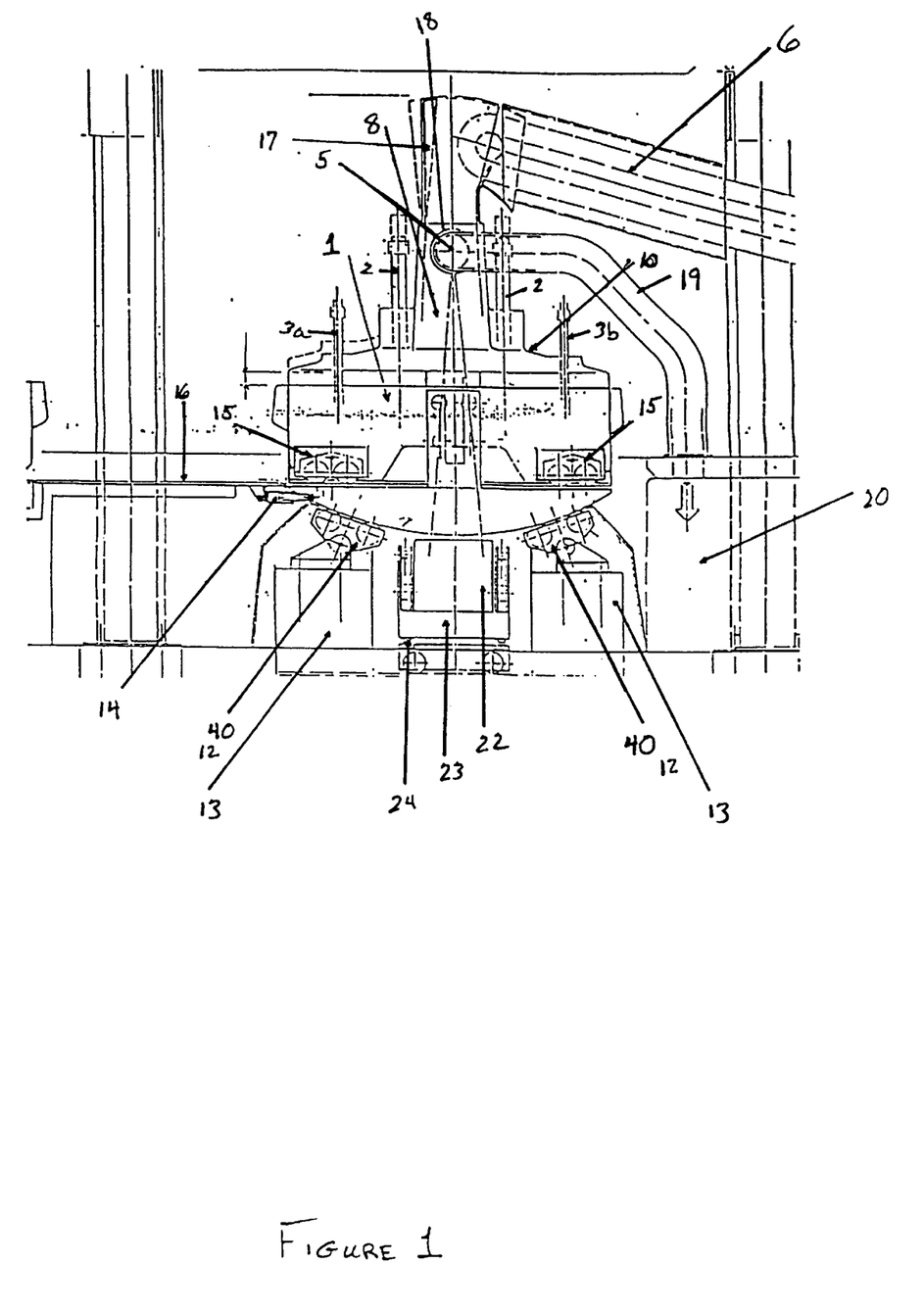
FIG. 1 is a diagrammatic front view of the invention showing is exterior features.
Figure 2:
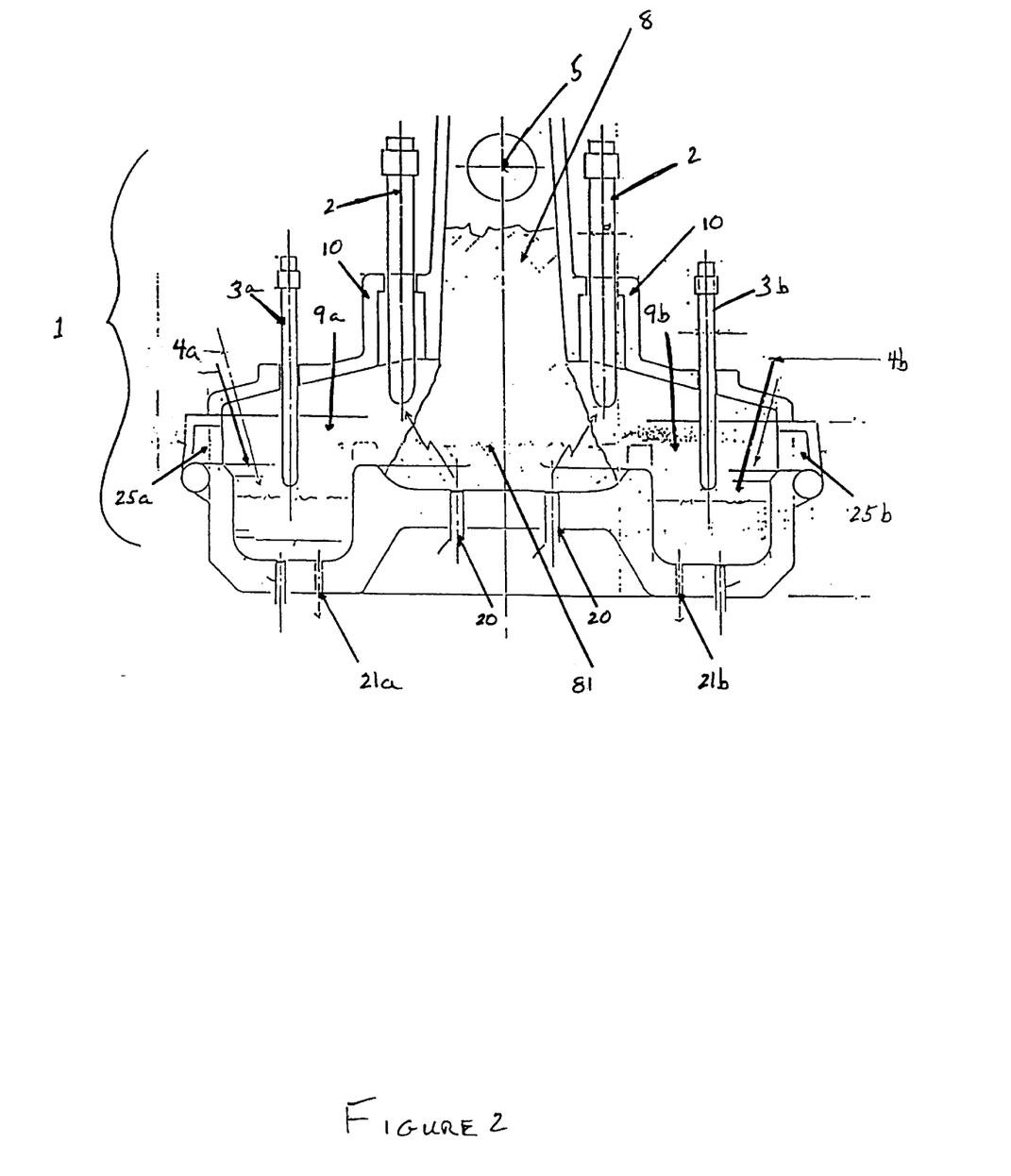
FIG. 2 is a diagrammatic cut-away front view of the furnace, in cross-section, showing its interior features.
Figure 3:
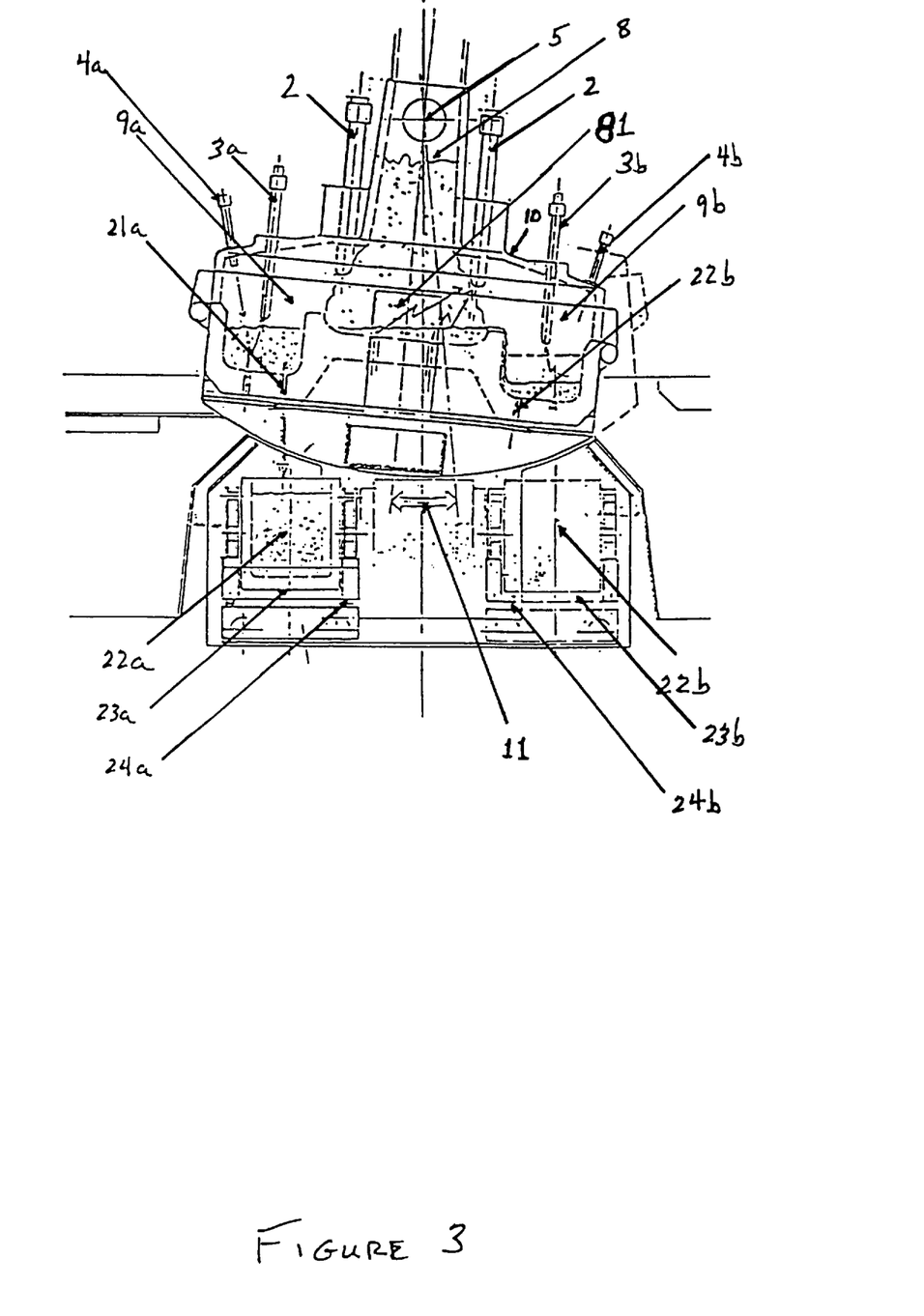
FIG. 3 is a diagrammatic front view of the furnace showing it in a tilted state for tapping into a ladle car.
Figure 5:
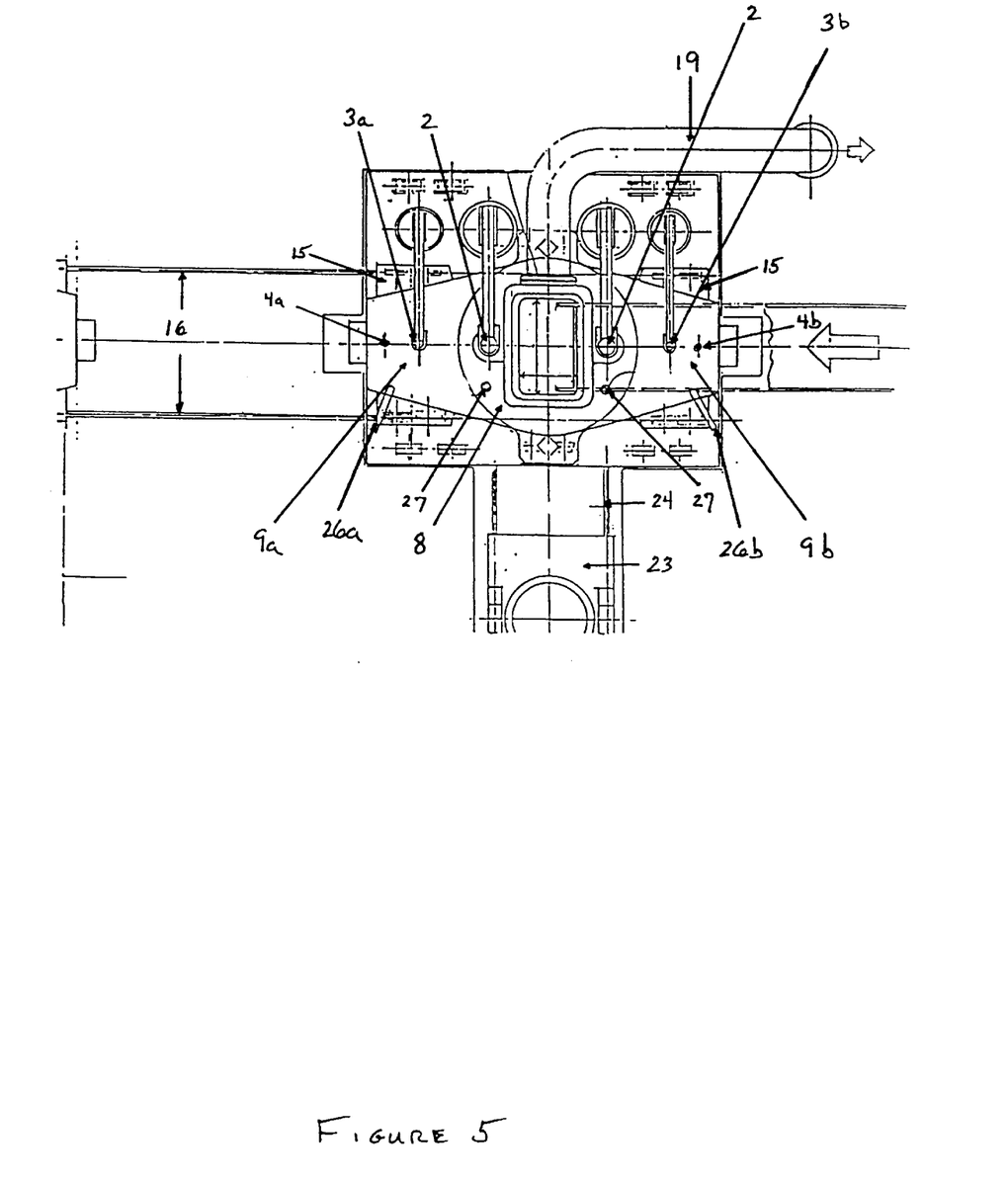
FIG. 5 is a top view of the invention positioned on a wheeled car.

Referring now to FIGS. 1 through 3 and beginning at the top of the furnace, the electric arc furnace 1 has a charging means 6 for continuously charging ferrous materials such as sponge iron, scrap iron or iron ore into the furnace 1. These materials can be hot or cold when they are charged. The charging means 6 can be any or a combination of available conveyance means for charging furnaces, but preferably is a conveyor belt which transports the charge into central stack 8 which extends vertically from the roof of the furnace 10. Incoming charge material is directed through central stack 8 into the central melting zone 81 located within the main body of the furnace, beneath the opening of central stack 8. Charge seal 17, which is a box-like structure which can be suitably closed and which allows for movement about the structure, is provided at the articulation of charging means 6 and central stack 8 in order to seal the central stack 8 after materials have been charged thereinto. Charge seal 17 is hinged to allow it to move with furnace I as the furnace tilts during operations. A plurality of central charge ducts 27 can be added adjacent to central stack 8 through which ferrous materials including sponge iron may also be introduced into the furnace. The embodiment depicted in FIG. 5 shows two central charge ducts 27, but any suitable number may be used. Pre-heated material can be charged through central charge ducts 27.

Pivot point 5 is located on central stack 8 along the vertical axis of the furnace, approximately midway between charging means 6 and the roof of the furnace 10. Pivot point 5 is preferably positioned in the higher part of central stack 8, but may also be positioned in any other suitable location. The furnace 1 moves about pivot point 5 when the furnace is tilted, as described herein. Exhaust conduit 19 is connected to central stack 8 at pivot point 5 in order to exhaust the reaction gases from the furnace. Exhaust conduit 19 is preferably lined with refractory material or otherwise cooled through conventional means. Exhaust gases from the furnace are routed through central stack 8 into exhaust conduit 19, and then into an air pollution control device 20, which can be conventional equipment, such as a scrubber or baghouse, necessary to meet applicable emission control requirements. Mechanical seal 18 is located in central stack 8 near rotation center 5 and functions to prevent emissions from bypassing exhaust conduit 19 and continuing upward in central stack 8 as furnace I moves from side to side. The mechanical seal can be provided as labyrinth type filled with rockwool or fiberglass. However, heat rising up central stack 8 serves to preheat the downward-falling ferrous material that is charged into furnace 1 as that material passes below rotation center 5 on its way to melting zone 81.

The roof of the furnace 10 is fitted with a means for melting material charged into the furnace. Preferably, the means for melting are central electrodes 2 adjacent to the central stack 8. The electrodes protrude into the central melting zone 81 and provide the electrical energy needed to melt the ferrous materials charged into the melting zone 81 through the central stack 8. FIGS. 1–3 show a preferred embodiment of two central electrodes 2 into the central melting zone 81, but the invention may have another suitable number of electrodes. Central electrodes 2 may be either alternating current (AC) or direct current (DC) electrodes as desired.

Within the body of furnace 1 are two lateral shafts 9a and 9b which are lateral and adjacent to central melting zone 81. Charge that is melted in the central melting zone 81 flows into either or both of the lateral shafts 9a and 9b as desired by the operator. The interior base of lateral shafts 9a and 9b is physically lower in elevation than the floor of central melting zone 81 to receive the incoming flow of molten steel from central melting zone 81. Additional means for melting and refining molten steel in lateral shafts 9a and 9b are provided in furnace roof 10. Preferably, these means for melting are lateral electrodes 3a and 3b, which protrude through furnace roof 10 into lateral shafts 9a and 9b, respectively, for the further melting and refining of molten steel which flows into lateral shafts 9a and 9b from central melting zone 81, as shown in FIGS. 2 and 3. In a preferred embodiment of the invention, lateral electrodes 3a and 3b are DC electrodes. There are means 4a and 4b for injecting solid or gaseous fuels and comburents, such as oxygen, or only oxygen, fitted into the furnace roof 10 above lateral shafts 9a and 9b, respectively. Preferably, the oxygen injection is supersonic, and the other injection means 4a and 4b may be at least sonic. In another embodiment, injection means 4a and 4b can be designed for a thick jet lance and to charge additives into lateral shafts 9a and 9b during the melting or refining steps to modify the composition of the molten metal and slag. Each lateral shaft 9a and 9b can be further defined by refractory lined lateral charge ducts 26a and 26b extending through the furnace roof 10 into the lateral shaft through which molten cast iron may be introduced directly into the lateral shaft, as shown in FIG. 5.

Figure 4:
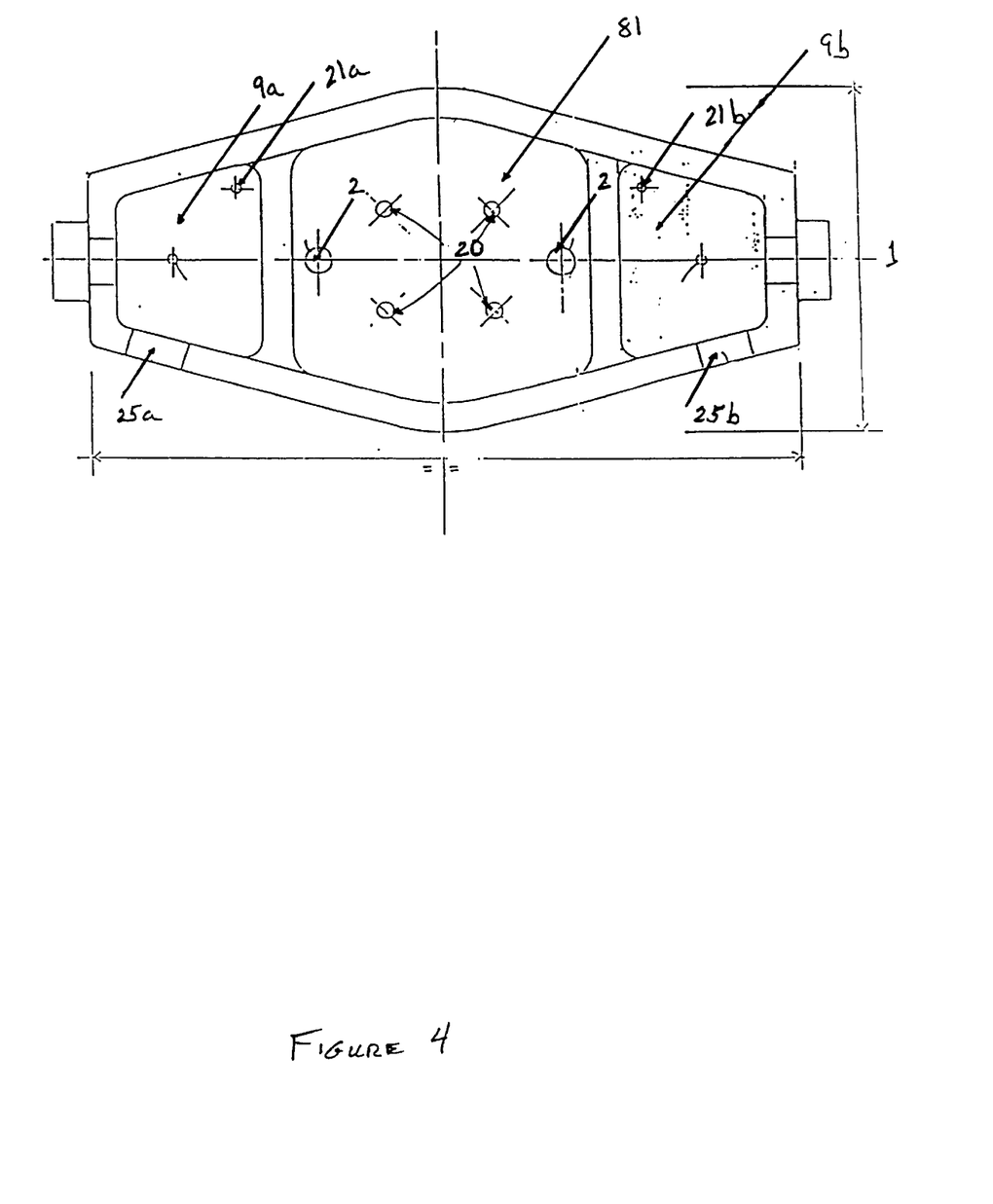
FIG. 4 is a top, cut view of the furnace according to an embodiment of the invention where the deslagging doors are positioned beside the lateral shafts.

The body of furnace 1 is further defined by at least one deslagging door. Preferably, two deslagging doors, 25a and 25b, are located at the outside wall of each lateral shaft 9a and 9b, as shown in FIGS. 2, 3 and 4. Slag is removed from the furnace through the deslagging doors 25a and 25b after every heat. The deslagging doors can be positioned in front of the furnace 1, at opposite sides with respect to the furnace tilting motion. In another solution, the deslagging doors can be positioned beside the lateral shafts 9a and 9b, as shown in FIG. 4. The body of furnace 1 is also defined by at least one tapping port in each lateral shaft. In a preferred solution, tapping ports 21a and 21b are located in the interior bottom of each lateral shaft 9a and 9b, as shown in FIGS. 2–4. Molten steel is tapped from lateral shafts 9a and 9b through lateral tapping ports 21a and 21b at the desired time. Lateral tapping ports 21a and 21b can be opened and closed by a magnetic system or by any other system which will function when there is molten steel remaining in lateral shaft 9a or 9b. In another embodiment, central tapping ports 20 may be located in the body of the furnace 1 beneath central melting zone 81 in order to tap molten steel directly from central melting zone 81. FIG. 4 shows an embodiment with four central tapping ports 20, but another suitable number may be used.

Beneath the body of furnace 1 are base structures 12 which can be made of suitable load-bearing materials such as concrete, steel or any combination of construction materials. Positioned atop base structures 12 are support elements 13 with wheels upon which furnace 1 sits. One alternative embodiment has a set of two wheels in each support means 13, as shown in FIG. 1. Hydraulic actuators 14 are provided beneath the body of the furnace 1, above and lateral to support elements 13. The hydraulic actuators 14 function to push the body of furnace 1 laterally with respect to its vertical axis, thereby rolling it upon the wheels of the support elements 13 and tilting the furnace as desired by the operator. The oscillation of the furnace is small but sufficient to convey molten steel into one lateral shaft from central melting zone 81 while allowing melting and refining to be carried out in the alternate lateral shaft. The tilt angle 11 of the furnace, as shown in FIG. 3, can reach 15 degrees and advantageously reaches up to 5 degrees in each lateral direction from the vertical axis.

Also beneath the body of furnace 1 and located beneath lateral tapping holes 21a and 21b of each lateral shaft 9a and 9b are ladles 22a and 22b for receiving molten steel, as shown in FIG. 3. The ladles are transported independently to and from the furnace by ladle cars 23a and 23b that run on ladle rails 24a and 24b for each ladle. A variant embodiment of the invention uses a single ladle car running below the furnace 1 to be positioned under central melting zone 81 or either lateral shaft 9a or 9b, as shown in FIG. 1.

The body of furnace 1 preferentially may be positioned on a furnace car 15 beneath the furnace, with the furnace car running on furnace rails 16. This configuration allows the furnace body to be easily removed for maintenance, repair or replacement of components, thereby minimizing shutdown and maintenance time. Furnace rails 16 should be aligned in a different direction from ladle rails 24a and 24b to permit the furnace body to move in an independent direction from ladle cars 23a and 23b. FIG. 5 shows an embodiment in which furnace rails 16 are perpendicular to ladle rails 24a and 24b.

Figure 6:
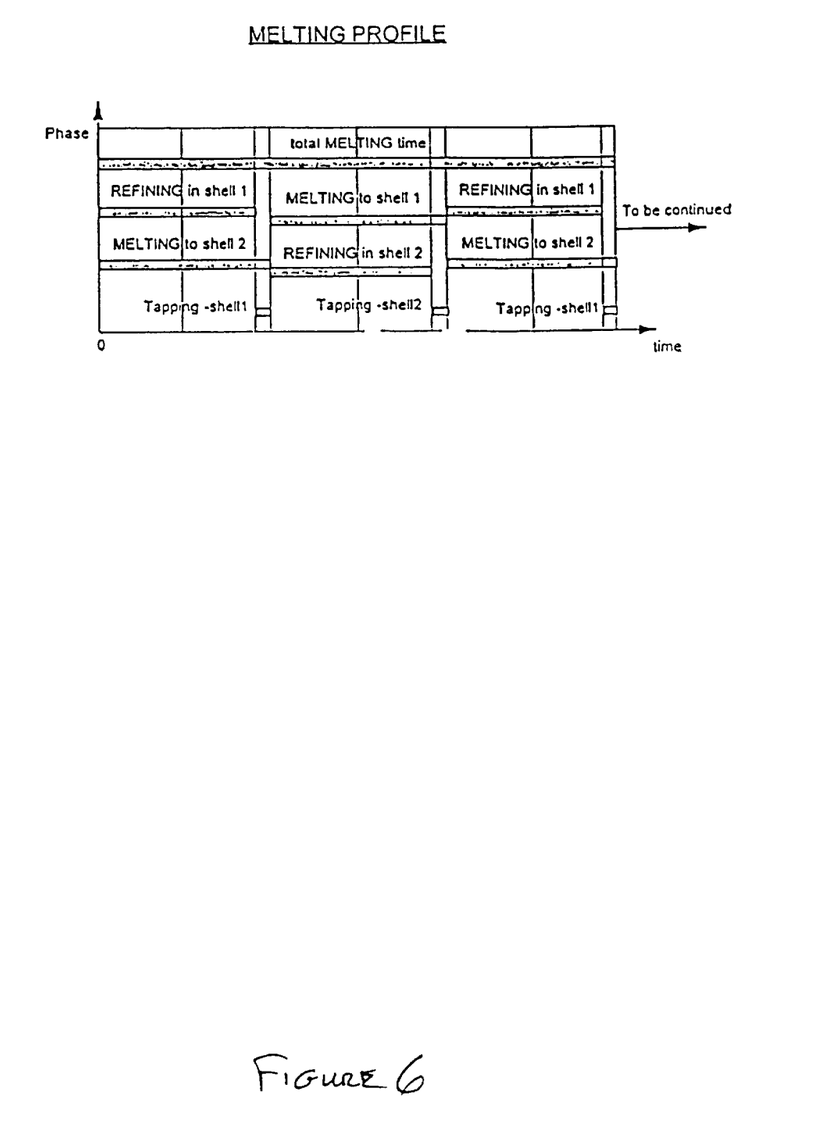
FIG. 6 is a sketch of the melting profile of the furnace.

FIG. 6 summarizes one embodiment operation of the furnace as described herein. The process is begun by charging ferrous stock material through central stack 8 into central melting zone 81. Central electrodes 2 begin melting the charged material. The furnace is then tilted to allow the molten steel to drain into one of the lateral shafts 9a or 9b, wherein additional melting and refining occur through the action of lateral electrodes 3a or 3b. Ferrous materials are continuously being charged into central melting zone 81, through central stack 81 or central charge ducts 27, and melted therein, and the furnace is then tilted to allow the newly melted steel to drain into the other lateral shaft 9a or 9b. Meanwhile, when the molten steel has achieved its desired characteristics in the first lateral shaft 9a or 9b, that lateral shaft is tapped into its respective ladle car system and slag is removed through its respective deslagging door. After that shaft is emptied, it is ready to receive more molten steel from central melting zone 81. The furnace is titled from side-to-side to allow for the refilling of molten steel from central melting zone 81 into lateral shafts 9a and 9b and subsequent melting and refining in the lateral shafts, and to allow for the semicontinuous tapping of molten steel from each shaft. Central stack 8 continues to receive charged materials through charging means 6, and those materials continue to be melted in central melting zone 81 as the furnace operates.

This invention offers many features that are not available in the present art:

the charge is continuous and several types of materials can be charged simultaneously.

In conventional furnaces, this is not possible because materials must be charged either in separate steps or by shutting down the furnace;

the required melting time is reduced because the furnace works continuously;

the process operates continuously without ever switching off or reducing the electric energy supply, and therefore there is zero "power off time";

the thermal energy released during the melting and refining process is used to preheat incoming charge material;

heat and emissions released into the environment are reduced because the furnace always works with closed cover;

all motions required for charging, melting, refining and tapping the steel are automated;

the furnace tilting motion enables the steel to be refined during the melting process thus assuring a precise control of the steel temperature and composition. The steel being refined is not polluted by melting materials flowing out of the opposite shaft;

liquid cast iron can be charged into a lateral shaft and the heat produced in the process can be used for preheating the scrap in the central stack;

dust dispersion is reduced and, therefore, transformation yield is improved;

preheating the charge of ferrous materials in the stack recovers heat;

offgas temperature can be adjusted by adjusting the material charging process so that it issues at a temperature of 800–900 degrees Centigrade, thus eliminating the need for a successive post-combustion chamber and reducing emissions into the environment.

the electrodes oxidize more slowly because they are switched on at all times;

the central stack can be charged quickly without removing either the roof or the electrodes;

the life of the shaft refractor lining is prolonged because the roof is always closed, thereby eliminating thermal shocks;

the furnace is less noisy because the material in the furnace is always hot.

The invention can be advantageously adapted for charging the furnace with sponge iron that can be charged in lateral shafts 9a and 9b via lateral charging ducts 26a and 26b. The additional benefits derived therefrom are a wider surface area for charging; lower particulate emissions because exhaust gases in central stack 8 have a lower ascending speed than gases flowing through conventional furnaces and, therefore, the particulates settle more easily and fall inside the furnace improving furnace yield; using central stack 8 as a combustion chamber for the carbon monoxide gas originating from charge melting; and possibly adding, in central stack 8, means for injecting oxidizing gases (air, oxygen) to control post-combustion processes.

What is claimed is:

1. An electric arc furnace for continuous charging of ferrous materials and semicontinuous tapping of molten steel, comprising: (a) a body, having a central melting zone and at least two lateral shafts adjacent to said central melting zone, the base of said central melting zone being higher in elevation than the bases of said lateral shafts; (b) a roof over said body; (c) a central stack extending vertically from said roof above said central melting zone, said central stack having a means for charging ferrous materials into said central melting zone, having a means for removing exhaust gases from said central melting zone, and having a pivot point located below said means for charging; (d) a means for melting material charged into the furnace; (e) a means for tapping molten steel from the furnace; (f) a means for injecting refining aids into said lateral shafts; (g) at least one deslagging door positioned within said body; and (h) a means for tilting the furnace to alternatively tap said lateral shafts.

2. An electric arc furnace as set forth in claim 1, wherein said means for melting material charged into the furnace comprises a plurality of electrodes introduced through said roof into said body.

3. An electric arc furnace as set forth in claim 2, wherein there are at least two central electrodes introduced into said central melting zone of said body.

4. An electric arc furnace as set forth in claim 3, wherein the central electrodes are direct current electrodes.

5. An electric arc furnace as set forth in claim 2, wherein there is at least one lateral electrode introduced into each lateral shaft of said body.

6. An electric arc furnace as set forth in claim 2, wherein said means for charging ferrous materials is a conveyor belt connected with the top of said central stack.

7. An electric arc furnace as set forth in claim 1, wherein said means for charging ferrous materials includes a charge seal.

8. An electric arc furnace as set forth in claim 1, wherein said means for removing exhaust gases is an exhaust conduit connected to said central stack.

9. An electric arc furnace as set forth in claim 1, wherein said central stack includes a mechanical seal to prevent emissions from bypassing said exhaust conduit.

10. An electric arc furnace as set forth in claim 9, wherein said mechanical seal allows heat to rise up said central stack.

11. An electric arc furnace as set forth in claim 1, wherein said means for tapping molten steel comprises a plurality of tapping ports disposed into the bottom of said furnace body.

12. An electric arc furnace as set forth in claim 11, wherein at least one lateral tapping port is disposed into the bottom of each said lateral shaft for filling a plurality of ladles beneath said tapping ports.

13. An electric arc furnace in claim 11, wherein at least one central tapping port is disposed into the bottom of said central melting zone.

14. An electric arc furnace as set forth in claim 11, wherein said ladles are transported by ladle cars and ladle rails.

15. An electric arc furnace as set forth in claim 14, wherein at least one ladle having a ladle car and ladle rail is located beneath each lateral tapping port.

16. An electric arc furnace as set forth in claim 14, wherein at least one ladle having a ladle car and ladle rail is located beneath the central melting zone.

17. An electric arc furnace as set forth in claim 1, wherein said means for injecting refining aids are supersonic.

18. An electric arc furnace as set forth in claim 17, wherein said refining aids are selected from a group comprising solid fuel, gaseous fuel, liquid fuel and comburents.

19. An electric arc furnace as set forth in claim 18, wherein one of said refining aids is oxygen injected via supersonic means.

20. An electric arc furnace as set forth in claim 1, wherein said furnace roof comprises a plurality of charge ducts for charging ferrous materials into said furnace body.

21. An electric arc furnace as set forth in claim 20, wherein at least one charge duct is disposed into said central melting zone of said body.

22. An electric arc furnace as set forth in claim 20, wherein at least one charge duct is disposed into each lateral shaft of said body.

23. An electric arc furnace as set forth in claim 1, wherein said means for tilting comprises a base structure, support element with wheels and hydraulic actuator.

24. An electric arc furnace as set forth in claim 1, wherein said means for tilting enables the furnace to be tilted up to 15 degrees along the vertical axis of the furnace.

25. An electric arc furnace for continuous charging of ferrous materials and semicontinuous tapping of molten steel, comprising (a) a body, having a central melting zone and at least two lateral shafts adjacent to said central melting zone, the base of said central melting zone being higher in elevation than the bases of said lateral shafts; (b) a roof over said body; (c) a central stack extending vertically from said roof above said central melting zone, said central stack having a conveyor to charge materials and a charge seal, having a pivot point located below said conveyor, having an exhaust conduit to remove exhaust gases, and having a mechanical seal to prevent gases from bypassing said exhaust conduit; (d) at least two electrodes disposed through said roof into said central melting zone and at least one electrode disposed through said roof into each lateral shaft; (e) a plurality of charging ducts disposed through said roof into said body; (f) a least one tapping port disposed into said base of each lateral shaft and at least one ladle positioned beneath each said tapping port; (g) at least one deslagging door disposed into said body; (h) a supersonic means for injecting refining aids disposed through said roof into said lateral shaft; and (i) a support element with wheels and a hydraulic actuator positioned beneath each said lateral shaft of said body.

26. An electric arc furnace as set forth in claim 25, wherein said ladle is positioned on a ladle car.

27. An electric arc furnace as set forth in claim 26, wherein said ladle car is situated on a ladle rail.

28. An electric arc furnace as set forth in claim 25, wherein at least one tapping port is disposed into the base of said central melting zone.

29. An electric arc furnace as set forth in claim 25, wherein said body is positioned on a furnace car.

30. An electric arc furnace as set forth in claim 29, wherein said furnace car is situated on furnace rails.

31. An electric arc furnace as set forth in claim 25, wherein said support element with wheels and hydraulic actuator tilt the furnace up to 15 degrees along the vertical axis of the furnace.

32. A process for continuously charging, ferrous materials into, and semicontinuously tapping molten steel from, an electric arc furnace, comprising (a) continuously charging ferrous materials into a central stack extending from the furnace and leading into a central melting zone; (b) continuously melting said charged ferrous materials in said central melting zone; (c) intermittently tilting the furnace to pour molten steel into lateral shafts adjacent to said central melting zone; (d) refining molten steel in said lateral shafts; (e) intermittently tapping molten steel from the furnace; and (f) intermittently removing slag from the furnace.

33. The process as set forth in claim 32, wherein said step of intermittently tapping molten steel includes alternatively tapping molten steel from each of said lateral shafts.

34. The process as set forth in claim 32, wherein said step of refining molten steel includes additional melting in each of said lateral shafts.

35. The process as set forth in claim 32, wherein said step of refining molten steel includes using a refining aid selected from a group comprising solid fuel, gaseous fuel, liquid fuel and combustents.

36. The process as set forth in claim 32, wherein said step of intermittently tilting includes tilting the furnace at an angle of up to 15 degrees along its vertical axis.

37. The process as set forth in claim 31, wherein said step of continuously charging includes using charging ducts to charge materials into the furnace.

* * * * *

UNITED STATES PATENT AND TRADEMARK OFFICE
CERTIFICATE OF CORRECTION

PATENT NO. : 6,269,112 B1
DATED : July 31, 2001
INVENTOR(S) : Alfredo Poloni et al.

Page 1 of 1

It is certified that error appears in the above-identified patent and that said Letters Patent is hereby corrected as shown below:

<u>Column 2,</u>
Line 52, delete "is" and insert -- its --

<u>Column 5,</u>
Line 35, delete "titled" and insert -- tilted --

Signed and Sealed this

Nineteenth Day of March, 2002

Attest:

JAMES E. ROGAN
*Director of the United States Patent and Trademark Office*

*Attesting Officer*